United States Patent
Allsbrook et al.

(10) Patent No.: US 11,652,741 B2
(45) Date of Patent: May 16, 2023

(54) METHOD FOR RECEIVING A REQUEST FOR AN API IN AN IOT HIERARCHY

(71) Applicant: Clearblade, Inc., Austin, TX (US)

(72) Inventors: David Aaron Allsbrook, Austin, TX (US); Steven Manweiler, Driftwood, TX (US); Sanket Deshpande, Austin, TX (US); Martin Pandola, Austin, TX (US)

(73) Assignee: Clearblade, Inc., Austin, TX (US)

( * ) Notice: Subject to any disclaimer, the term of this patent is extended or adjusted under 35 U.S.C. 154(b) by 0 days.

(21) Appl. No.: 16/357,779

(22) Filed: Mar. 19, 2019

(65) Prior Publication Data

US 2019/0297010 A1 Sep. 26, 2019

Related U.S. Application Data

(60) Provisional application No. 62/647,447, filed on Mar. 23, 2018.

(51) Int. Cl.
*H04L 45/00* (2022.01)
*H04L 41/00* (2022.01)
*H04L 45/48* (2022.01)
*H04L 45/02* (2022.01)

(52) U.S. Cl.
CPC ............ *H04L 45/563* (2013.01); *H04L 41/20* (2013.01); *H04L 45/04* (2013.01); *H04L 45/20* (2013.01); *H04L 45/48* (2013.01); *H04L 45/02* (2013.01)

(58) Field of Classification Search
CPC ......... G16Y 30/00; H04L 41/20; H04L 45/02; H04L 45/04; H04L 45/20; H04L 45/48; H04L 45/563; H04L 67/1095

USPC ........................................................ 370/256
See application file for complete search history.

(56) References Cited

U.S. PATENT DOCUMENTS

| | | | |
|---|---|---|---|
| 9,686,281 B2 | 6/2017 | Bulusu et al. | |
| 9,712,527 B2 | 7/2017 | Chuaprasert et al. | |
| 9,942,354 B1* | 4/2018 | Thompson | H04L 67/125 |
| 10,972,588 B2* | 4/2021 | Amin | G06F 11/2005 |
| 2014/0129512 A1 | 5/2014 | Kawecki, III | |
| 2015/0249672 A1* | 9/2015 | Burns | G06F 21/629 |
| | | | 726/4 |

(Continued)

OTHER PUBLICATIONS

Zhang, Zhensheng "Non-Final Office Action—U.S. Appl. No. 16/799,298" dated Jan. 25, 2022; pp. 1-24 dated Jan. 25, 2022.

(Continued)

*Primary Examiner* — Omar J Ghowrwal
(74) *Attorney, Agent, or Firm* — Stephen H. Hall; Ryan J. Letson; Bradley Arant Boult Cummings LLP (57) ABSTRACT

The present invention relates to IoT devices existing in a deployed ecosystem. The various computers in the deployed ecosystem are able to respond to requests from a device directly associated with it in a particular hierarchy, or it may seek a response to the request from a high order logic/data source (parent). The logic/data source parent may then repeat the understanding process to either provide the necessary response to the logic/data source child who then replies to the device or it will again ask a parent logic/data sources for the appropriate response. This architecture allows for a single device to make one request to a single known source and potentially get a response back from the entire ecosystem of distributed servers.

10 Claims, 7 Drawing Sheets

(56) References Cited

U.S. PATENT DOCUMENTS

| | | | |
|---|---|---|---|
| 2016/0006645 A1* | 1/2016 | Rave | H04L 12/2854 709/203 |
| 2016/0043942 A1 | 2/2016 | Purohit et al. | |
| 2016/0066358 A1* | 3/2016 | Kim | H04W 76/14 370/329 |
| 2017/0230447 A1 | 8/2017 | Harsha et al. | |
| 2017/0359300 A1* | 12/2017 | Patil | H04L 61/1541 |
| 2019/0090305 A1 | 3/2019 | Hunter et al. | |

OTHER PUBLICATIONS

Zhang, Zhensheng "Non-Final Office Action—U.S. Appl. No. 17/032,955" pp. 1-28 dated Mar. 23, 2022.

* cited by examiner

METHOD FOR RECEIVING A REQUEST FOR AN API IN AN IOT HIERARCHY

CROSS REFERENCE TO RELATED APPLICATIONS

This application claims priority to U.S. Provisional Application Ser. No. 62/647,447, titled "System and Method for IOT Systems of Logic Across a Continuum of Computers," filed on Mar. 23, 2018, the entire contents of which are herein incorporated by reference.

FIELD OF THE INVENTION

The field of the invention relates to a system and method for IoT, or Internet of Things, systems of logic across a continuum of computers.

BACKGROUND

IoT is becoming more prevalent, and solutions are beginning to be a part of our everyday lives. Over the last few years, there are trends like MQTT, API-first, IoT Platform, Intelligent Edge. As the number of software applications have grown, many developers and application owners have stored and run their applications in the "cloud", e.g., in large remote server farms accessible over the internet.

While many of these cloud providers are structured to house and protect large amounts of data and applications, having applications run remotely has some disadvantages, including the cost of communicating to and from the cloud, as well as requiring an internet connection, and the time it takes to send or receive information from the cloud that may be hundreds or thousands of miles away. Moreover, in most instances, there is not a direct "connection" between a user of a particular software or app and the cloud. Rather, there may be a large number of hubs or "hops" for a user to ultimately connect to the desired cloud location. This can cause particular problems when there is a large amount of data or there are a lot of requests to and from the cloud. Considering the internet infrastructure, there may be a server that a person interacts with, but there are lots of "hops" along the way between a user's browser and that content. When looking at a static website a user may never actually even communicate with actual hosting server but instead a cached version stored in a CDN.

One example outside of the IoT space is NETFLIX Open Connect CDN. It takes a long time to pull all those movies and television shows from a central cloud to homes around the world. Thus, to address this, the NETFLIX Open Connect hardware local ISPs keep caches of content. This is a massive hardware/software build for NETFLIX specific to its use case, but moves the data from a single central location, to having multiple copies of content distributed geographically closer to its users. While IoT is different than streaming static video, IoT will be a tremendous user of bandwidth and demand high speeds.

SUMMARY OF THE INVENTION

Applicant has developed systems and methods involving Edge Computer Continuum, representing many layers of computer infrastructure made available to be used as part of the whole IoT application to provide a hierarchy-based, fastest path to every device. The various hardware located at the various hubs between a user and the server that the user interacts with, for example, the routing gear, the cell phone towers, and the satellites, all represent computing opportunities for IoT applications.

Applicant's systems and methods utilize the ubiquitous computing in today's IoT capable world to implement an edge compute continuum. According to Wikipedia, "Ubiquitous computing" (or "ubicomp") is a concept in software engineering and computer science where computing is made to appear anytime and everywhere. In contrast to desktop computing, ubiquitous computing can occur using any device, in any location, and in any format. A user interacts with the computer, which can exist in many different forms, including laptop computers, tablets and terminals in everyday objects such as a refrigerator or a pair of glasses. The underlying technologies to support ubiquitous computing include Internet, advanced middleware, overating system, mobile code, sensors, microprocessors, new ILQ and user interfaces, networks, mobile protocols, location and positioning, and new materials."

Applicant's systems and methods use these edge offerings, capable of chaining together. Ultimately, instead of costly on-off solutions made by large clouds or enterprise vendors, middleware capable of making this task easy and transparent for end developers is used.

Other objects and advantages of the present invention will become obvious to the reader and it is intended that these objects and advantages are within the scope of the present invention.

To the accomplishment of the above and related objects, this invention may be embodied in the form illustrated in the accompanying drawings/pictures, recognizing however, that the drawings are illustrative only, and that changes may be made in the specific construction illustrated and described within the scope of the appended claims.

BRIEF DESCRIPTION OF DRAWINGS

Various other objects, features and attendant advantages of the present invention will become fully appreciated as the same becomes better understood when considered in conjunction with the accompanying drawings.

An appendix is attached and incorporated herein by reference in its entirety and includes additional figures of various embodiments.

DETAILED DESCRIPTION

Various embodiments may have one or more of the components outlined below.

IoT devices existing in the deployed ecosystem 1 will have multiple requests for data and updates from their state. This information must be communicated in an efficient method reducing redundancy, execution time and errors. To achieve this, a device (e.g., device 3 of FIG. 1) must be able to request information from or give information to a logic/data source (e.g., child 2 in FIG. 1). A logic/data source may be similar to a server application. In order to meet speed or data requirements, the logic/data source child 2 may be able to respond to the device 3 directly or it may understand that the request must be met by a higher order logic/data source (a "parent," such as parent 30 in FIG. 1). It may need the parent's 30 source due to additional requirements like ability to compute machine learning algorithms, access to secured third-party systems, or need to share information with other logic/data sources (e.g., grandparent 40 or children 4, and 6 in FIG. 2).

Figure 1:
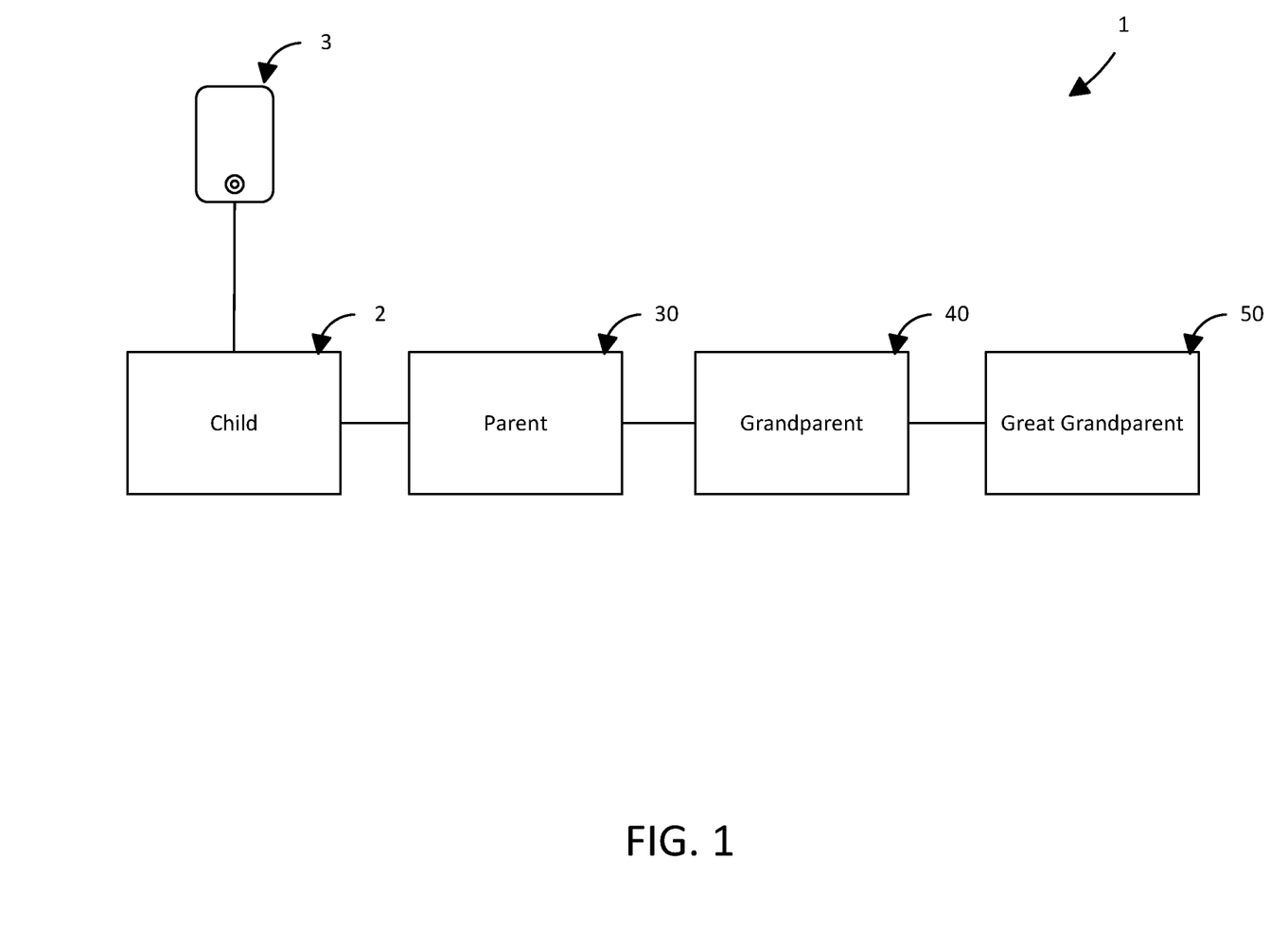
FIG. 1 depicts a deployed ecosystem of IoT devices in accordance with some embodiments of the present disclosure.

The logic/data source parent 30 may then repeat the understanding process to either provide the necessary response to the logic/data source child 2 who then replies to the device 3 or it will again ask a parent logic/data source (e.g., parent 30) for the appropriate response.

Figure 2:
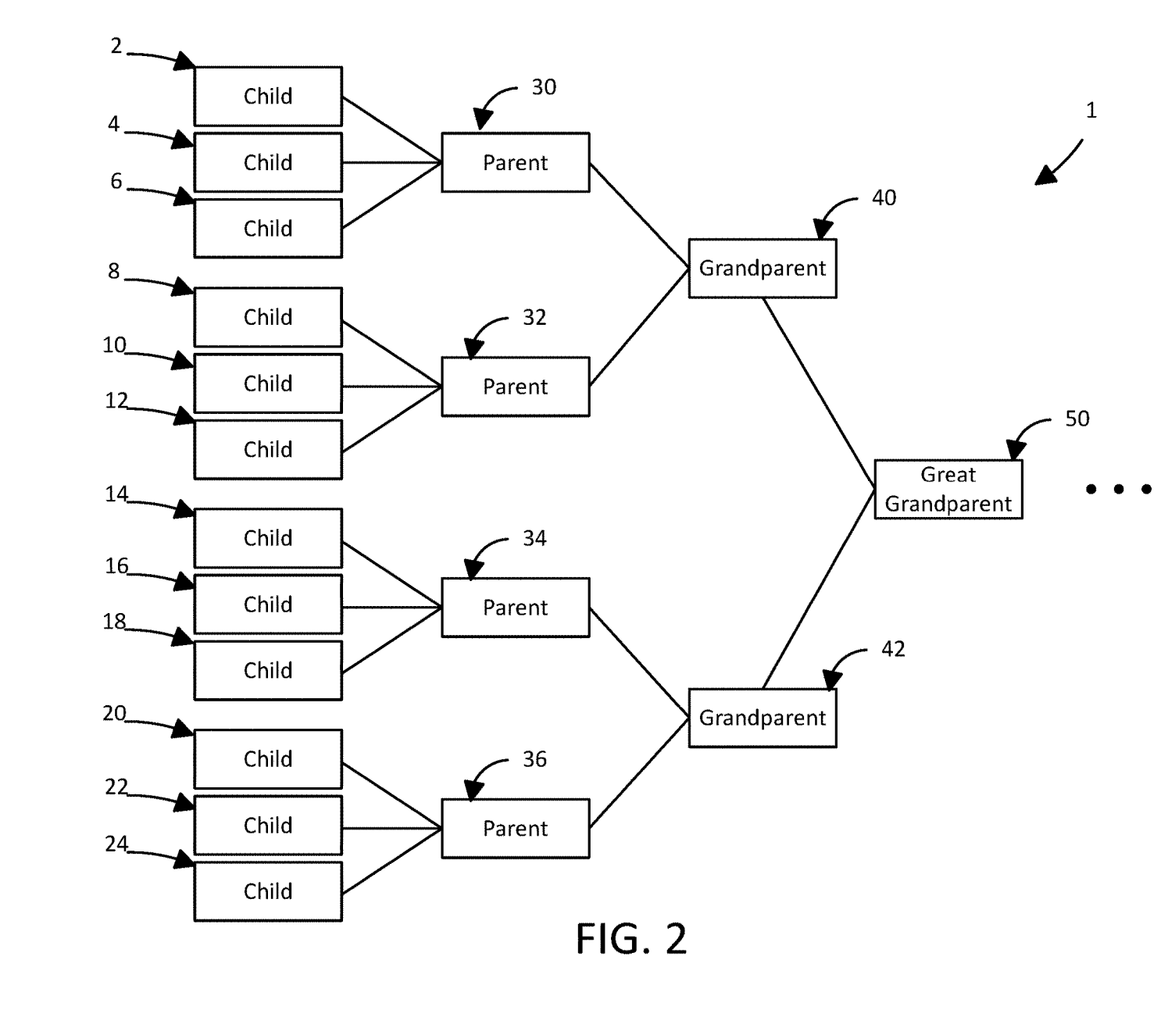
FIG. 2 is one embodiment showing one hierarchy of different computers in accordance with some embodiments of the present disclosure.

The goal of such an architecture allows for a single device, such as device 3 to make one request to a single known source (e.g., child data source 2) and potentially get a response back from the entire ecosystem of distributed servers (e.g., parent 30, grandparent 40, great grandparent 50, or any of the other various sources depicted in FIG. 2).

A device 3, also referred to herein as a "computer," may be included in a hierarchy that may be described as having layers, with computers in a particular layer being characterized as a child computer (e.g., children 2-24 in FIG. 2), the next layer as parent computers (e.g., parents 30-36 in FIG. 2), the next layer as grandparent computers (e.g., grandparents 40-42 in FIG. 2), the next layer as great grandparent computers (e.g., great grandparent 50 in FIG. 2), and so on for as many layers as may be needed or desired. An exemplary embodiment of one hierarchy is shown in FIG. 2. The computers may have operating systems, processors, RAM, and some database or storage. These computers can exist in many different forms, including desktop computers, laptop computers, tablets, smart phones, and terminals in everyday objects such as a refrigerator, thermostat, and other internet connected smart devices. The underlying technologies supporting this distributed computing include the internet, middleware, operating system, mobile code, sensors, microprocessors, new I/O, and user interfaces, networks, mobile protocols, location and positioning, and new materials.

The various computers across this continuum 1 of computers may be coupled to or communicate with each other via a network, such as the internet, local area network (LAN), wide area network (WAN), or the like. The network may include satellite communication, radio, and other ways to send or communicate data. The computers may include applications or programs stored in memory and executed on a processor. In some embodiments, the continuum 1 can be implemented on a UNIX-based system or other system. The systems and methods described in U.S. Pat. No. 9,038,015, the entire contents of which are hereby incorporated by reference, can be used to implement some aspects of the present disclosure.

In the past, the systems and methods described in U.S. Pat. No. 9,038,015 would likely be implemented in the cloud. However, using the system and method for IoT systems of logic across the continuum 1 of computers as discussed herein can result in faster processing, less expense, and more reliability.

At the various computers, or hubs described herein, embodiments may be implemented in code and may be stored on at least one storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

In one embodiment, use of the term control logic includes hardware, such as transistors, registers, or other hardware, such as programmable logic devices. However, in another embodiment, logic also includes software or code. Such logic may be integrated with hardware, such as firmware or micro-code. A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

In existing systems and methods, most applications and information is stored in the cloud in large cloud storage and computing farms. This can cause problems with security, performance, scalability, offline support, and have tremendous impacts on cost.

Figure 3:
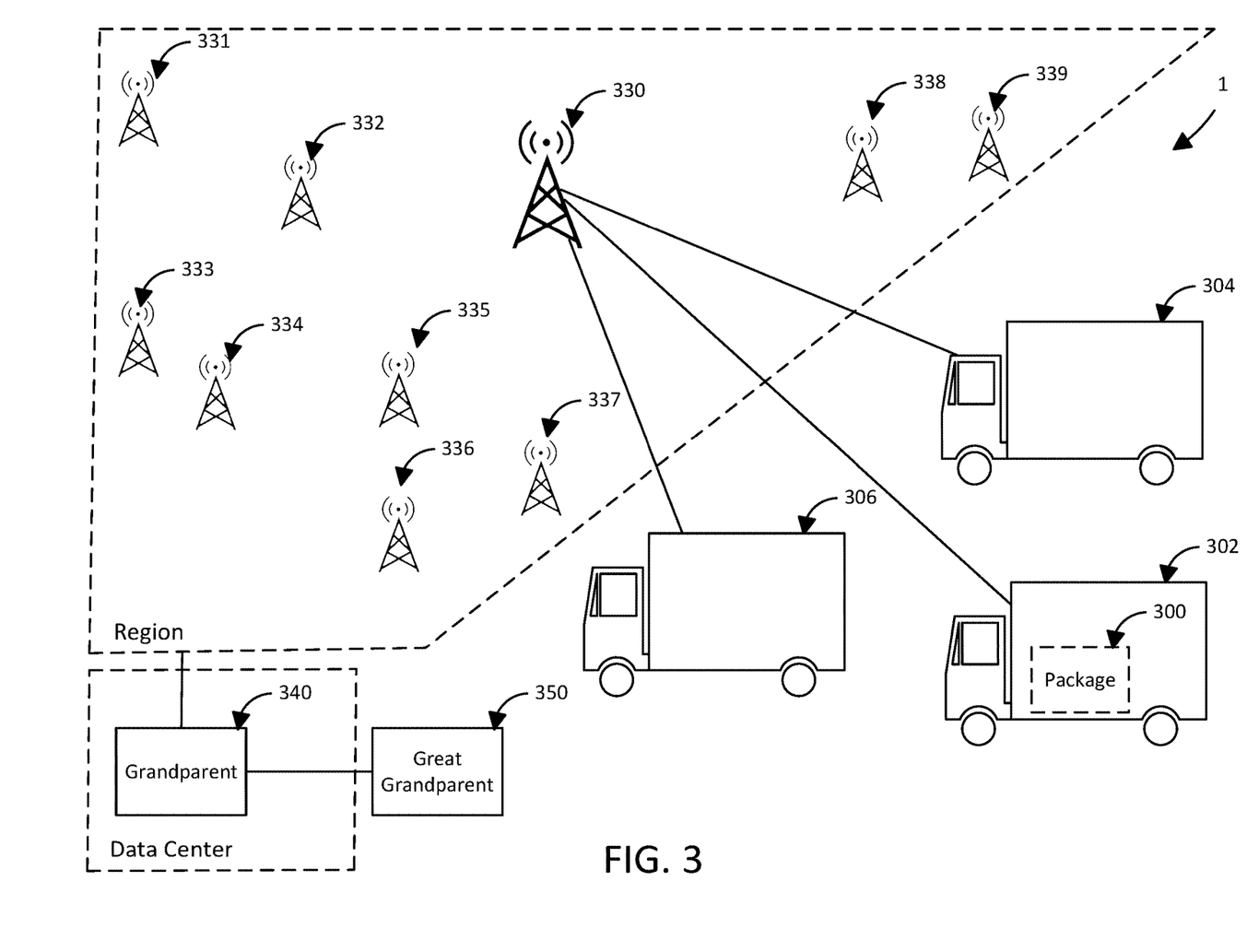
FIG. 3 depicts a deployed ecosystem of IoT devices for package tracking in accordance with some embodiments of the present disclosure.

As one example implementation and embodiment and with reference to FIG. 3, a delivery company may have a need to track and be able to report certain information associated with packages 300 it is handling. A particular delivery truck may have a truck computer 302 which can interact with the packages on board (e.g., package 300). The delivery truck may have information stored on the local truck computer 302 that includes how long the package has been on the truck, and where it needs to be delivered. However, a user within the delivery company (for example, the truck operator) may want or need to know from whom the package is sent. This information is not stored by the truck computer (the "child computer" 2 in the hierarchy described above), so it seeks that information from the computer that is up one level from it, or a parent computer (e.g., parent 30). In this embodiment, that parent computer might be a computer associated with a cell phone tower 330 (FIG. 3). The parent computer 330 is programmed to determine whether it has the data stored, namely from whom the package is sent, necessary to provide the answer to the child computer/truck computer 302. If it does not, it may seek that information from other child computers (e.g., truck computers 304, 306) with which it is associated and connected with in the hierarchy, or it can seek that information from the next higher computer in the hierarchy (e.g., a grandparent computer 340), which may be a larger regional data center computer that covers a specific region (and maybe containing ten (10) different cell phone tower hubs, e.g., hubs 331, 332, 333, 334, 335, 336, 337, 338, and 339). The grandparent computer 340 is similarly programmed to determine whether it has the data stored, and if it does not, it may seek that information from other parent computers with which it is associated and connected with in the hierarchy, or it can seek that information from the next higher computer in the hierarchy (a great grandparent computer 350).

Similarly, assume that an application running on the parent computer/cell phone tower hub needed to know how long a particular package (e.g., package 300) has been on the truck, such as truck 302. If that data is not stored at the parent computer/cell phone tower hub (e.g., hub 330), it could seek that information from all of its child computers (e.g., all the trucks 304, 306 that are associated with this particular parent computer/cell phone tower hub 330) and/or the grandparent (data center grandparent 340). Since that information is stored (in this example) in the truck 302 that has the particular package 300, the application running on the parent computer/cell phone tower hub 330 can obtain that information without having to go to the cloud.

Thus, some hubs in this ecosystem 1 may contain various aspects of information. In other words, the child computers/truck computers 302, 304, 306 may only retain information A, B, and C, the parent computer/cell phone tower hub 330 may retain information C, D, E, and F, and the great grandparent computer 350/regional data center 340 may retain A, F, G, H, I, J, and K, and other information is contained further up the chain. This configuration effectively deploys the information provider in various places throughout the ecosystem 1.

In this example, the truck 302 does not have to be configured to be able to seek information from the cell phone tower hub 330, the regional data center 340, and other potential sources of the information it seeks—rather it just has to be able to be configured to seek the requested information from its one connection to the cell phone tower hub 330. If the data sought is located at a hub computer up three levels (e.g., great grandparent 350), the truck computer 302 is unaware of that, and it does not matter to the truck computer 302.

This structure provides a number of technological solutions to some technological problems associated with traditional configurations and data flows. It can provide more real-time answers because the data requests are normally not required to be sent to and received from the "cloud", which is often hundreds or thousands of miles away. While the processing time for traditional requests is normally not minutes or hours, for some real-time applications, differences in seconds or even milliseconds of response times can make a significant difference. Additionally, having the data more localized can allow the requested information/connection if the connection to the cloud goes off line or is unavailable. Moreover, every time a request is sent to or information received from the cloud, costs are incurred. As a practical matter, for each "hop" in a network from a user's device to the cloud, there are costs that are incurred. When there are thousands, hundreds of thousands, or more requests and transmittals across the internet to and from the cloud, the costs can be substantial. By deploying the various information providers in a more distributed and localized fashion, the technological challenges and costs associated with storing and interacting with the cloud can be minimized.

The specific hub computer (i.e., the child computer 2, parent computer 30, grandparent computer 40, etc.) can be programmed or have logic that determines what data is or should be stored locally on that particular computer. The edge process described in U.S. Pat. No. 9,038,015 can be run on each computer. The computer can be a gateway, server, personal device, laptop, or any other type of computer. These computers can have rules that dictate how data and information is stored, transmitted, and the communication between hubs on different hierarchy levels. One or more of the computers can have algorithms that will implement the how, when, and the order of the communication between computers in the hierarchy. In various embodiments, those algorithms may include one or more of (a) cost efficient option (i.e., cheapest way to get data); (b) time performance optimization option (i.e., quickest way to get data); (c) priority (what communication layer should be used, e.g., satellite, radio, etc.); and/or (d) the order (i.e., do I check with parents first, children computers 5 first, etc.)

Figure 4:
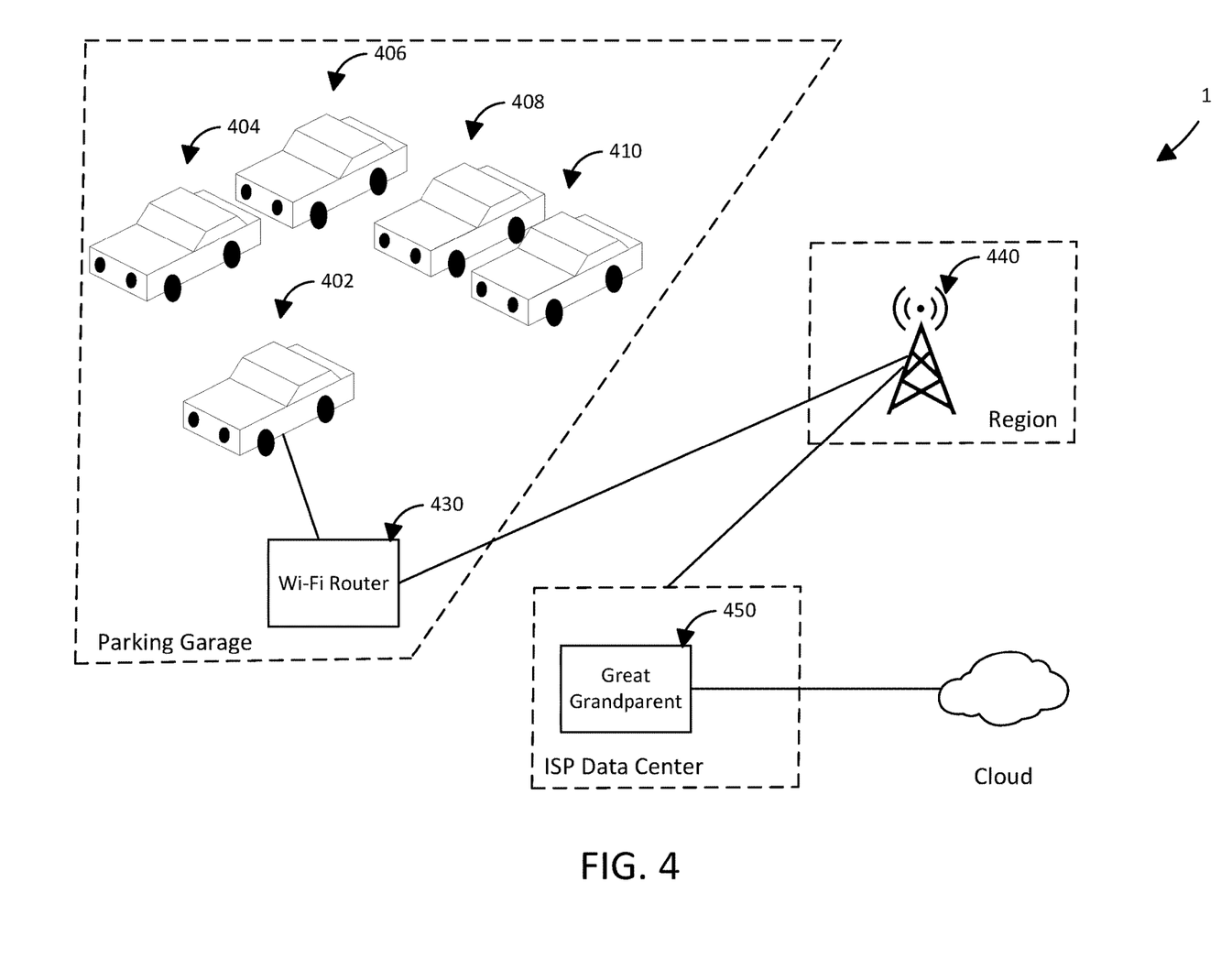
FIG. 4 depicts a deployed ecosystem of IoT devices for package tracking in accordance with some embodiments of the present disclosure.

As another example of one embodiment of the invention, a car 402 running an IoT traffic application (child computer 2 in this example) wants to know the status of traffic on I-35 near Austin, it may first ask the WI-FI router 430 in the parking garage 400 (parent computer 30). If the edge/application running in the WI-FI router 430 has recently answered that question and has it stored in memory, it may rapidly respond, otherwise it may reach upward to the cell phone tower 440 (grandparent computer 40), where another edge/application sits with a broader set of constituents (e.g., other towers in the region, as illustrated in FIG. 3). It again may answer a traffic request if it F has a recent information or it will ask the local ISP data center 450 (great grandparent computer 50). This ISP data center, is actually the target of local traffic data, meaning the status of the cars is sent to the ISP as it moves to the cloud. Rather than having to send the information up to the cloud to process and analyze the ISP is actually able to run the cloud logic locally and leverage the capability. This means that a serverless function that used to only run in the cloud now runs right where the data is closest and ingested. Now the ISP data center 450 can push that summary back up to a cloud so that other cities have access to traffic information, or it can keep it local, not wasting more computation resources. Additionally the original car 402 who made the request never had to know how the traffic question was answered, it simply asked and the application optimized itself and returned the information in the optimal manner.

In the traditional methodology, there might be a smart traffic application that assumes all cars are using 3G. All cars send their data to a local cell tower hub (local), which may send the data to a state hub, which may send the data to a regional hub, and which may then send it to a national cloud storage hub, for example, the Amazon cloud storage facility in Virginia. This requires quite a few "hops" from each node in the network, which can result in delays, and be costly over time.

Again, there is software running on these edge computers that is specific to each of these different applications. In the above example, a third party would write the traffic application and it is designed and configured to preferably optimize the hierarchy, where data is stored, where it is processed, etc. In other words, it is structured so that data elements A, B, and C, are stored at the child level (cars 402-410), elements D, E, and F are stored at the parent level (e.g., tower hub 440), and processing of X, Y, and Z are addressed at the parent level (hub 440). In some embodiments, requirements, data storage, and processing can be dynamically reallocated and/or deployed. For example, if a system is initially set up to store data element J at the grandparent level, but the system detects that child computers are requesting that data at a certain level (e.g., more than 10 times an hour), the system may dynamically redeploy and reallocate so that data element J is stored at the parent 10 level to minimize response times and reduce costs. Similarly, the system can also be predictively deployed or reallocated. For example, if the system has access to data that the temperature will be 100 degrees in about five days, the system may provide instructions to buy electricity now at a cheaper price.

In some embodiments, the system and method is configured to be take advantage of unstructured/unorganized communication. While a communication model where everyone (or every computer) speaks to everyone is great for a social network, it fails when it comes to enforcing truth and guaranteeing task completion. Consequently, the Edge Continuum of some embodiments contemplated by applicant remains a better implementation by forcing a hierarchy, guaranteeing a source of trust, and ensuring that every device that sends data or needs data gets an accurate responsive channel of communication.

IoT will become a reality in more and more everyday products, homes and businesses. As the momentum builds with more silicon providers making it cheaper to distribute accordingly, there will be a demand to better utilize the infrastructure.

Figure 5:
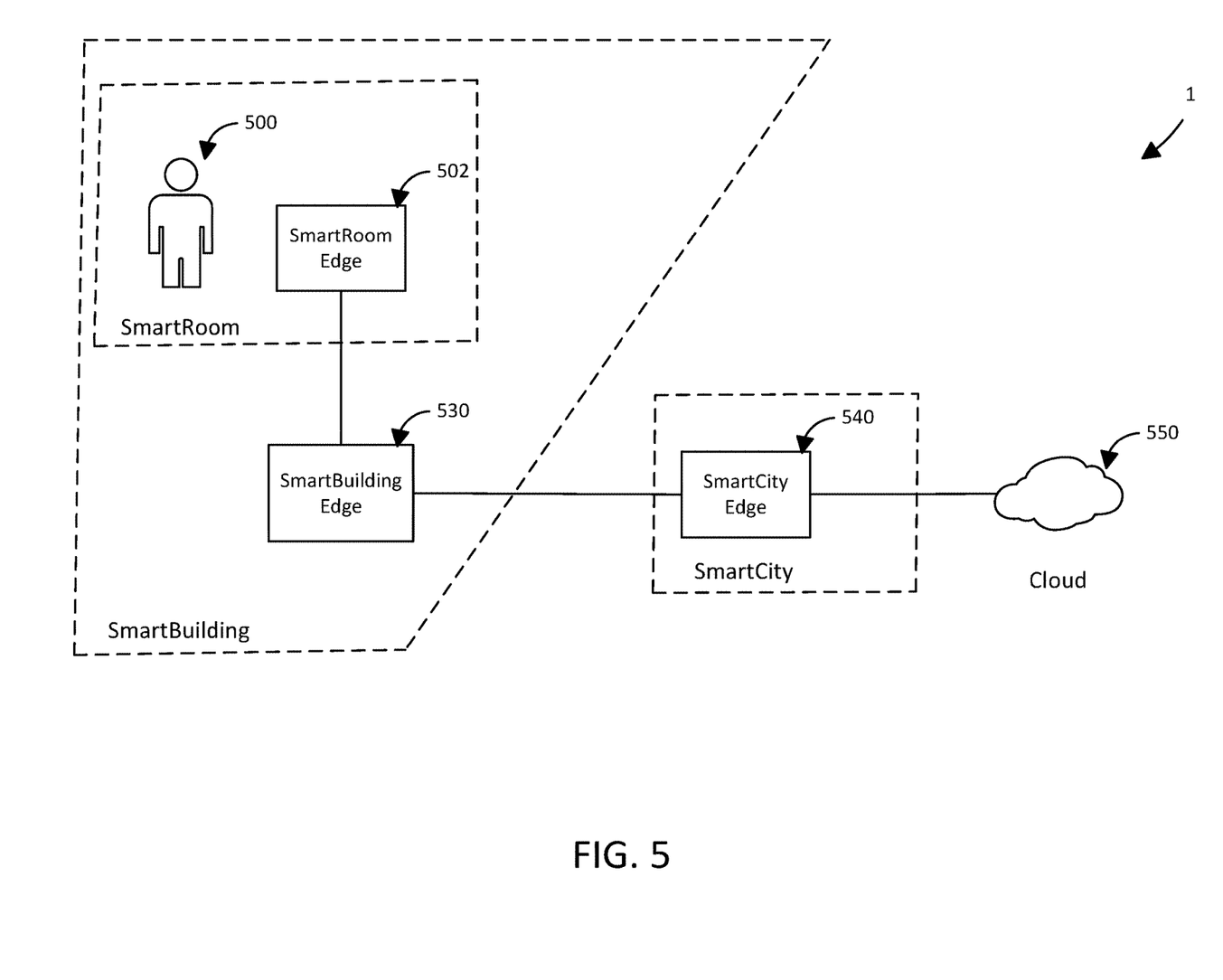
FIG. 5 depicts a deployed ecosystem of IoT devices for traffic monitoring in accordance with some embodiments of the present disclosure.

FIG. 5 depicts an optional configuration of the continuum 1 and its components in accordance with some embodiments of the present disclosure. FIG. 5 describes and shows the various computers and are labeled as "SmartRoom Edge" 502 (which might represent a "child computer"), a "SmartBuilding Edge" 530 (which might represent a "parent computer"), a "SmartCity Edge" 540 (which might represent a "grandparent computer"), and the Cloud 550 (which might represent a "great grandparent computer"). Although only one of each is shown, in the filled out ecosystem 1, there may be dozens, hundreds, or thousands (or more) of other computers represented by the single "SmartRoom Edge" computer 502, dozens, hundreds, or thousands (or more) of other computers represented by the "SmartBuilding Edge" 530, etc.

In an exemplary embodiment of the systems and methods related to temperatures, the types of activities and capabilities of the IoT system 1, and the possible workflow of the data requests that might be exchanged between the different computers.

Note that each depicted computer or node (e.g., with regard to FIG. 5, SmartRoom Edge 502, SmartBuilding Edge 530, SmartCity Edge 540, the Cloud 550, etc.) may be referred to herein individually as an "edge."

Activities of the IoT system 1 implemented by the edges can be defined as a set of application programming interfaces or "API's." This set may be referred to herein as a "schema." For temperature related operations, a schema of the system 1 can include APIs for activities such as requesting a room temperature, requesting a list of authorized room users, requesting a list of room owners, predicting the temperature based on a temperature history for the room, and predicting the room's temperature based on information from external data sources. The IoT system 1 thus may be configured to be capable of performing activities including but not limited to asking: 1) what is my temperature?; 2) who is allowed to read my temperature?; 3) who is allowed to set my temperature?; 4) what is my temperature likely to be based upon history?; and 5) what is my temperature likely to be based upon external factors?

Each edge can be aware of the API schema, but does not fully implement the APIs. To implement an API, the edge may need to have the full dataset or integrations necessary to fulfill the request. So, for example, a SmartRoom Edge 502 would need sufficient dataset or integrations to fulfill a request to implement the /getRoomTemperature API. SmartBuilding Edge 530 would need sufficient dataset or integrations to fulfill requests to implement the /getRoomUsers and /getRoomOwners APIs. SmartCity Edge 540 would need sufficient dataset or integrations to fulfill requests to implement the /predictTemperatureFromHistory API, and the Cloud 550 would need sufficient dataset or integrations to fulfill requests to implement the /predictTemperatureFromExternal API. Although each edge is aware of the API schema, each edge may not fully implement the APIs, and it is possible that an edge may not know which other edge implements an API or which APIs a particular edge can implement.

Each edge may have memory storage for storing data. In the context of implementing a schema for temperature activities, the information can include: temperature requests; users and owners of resources of any or various combinations of a SmartRoom or SmartBuilding or SmartCity; temperature history; and temperature information from external sources.

Figure 6:
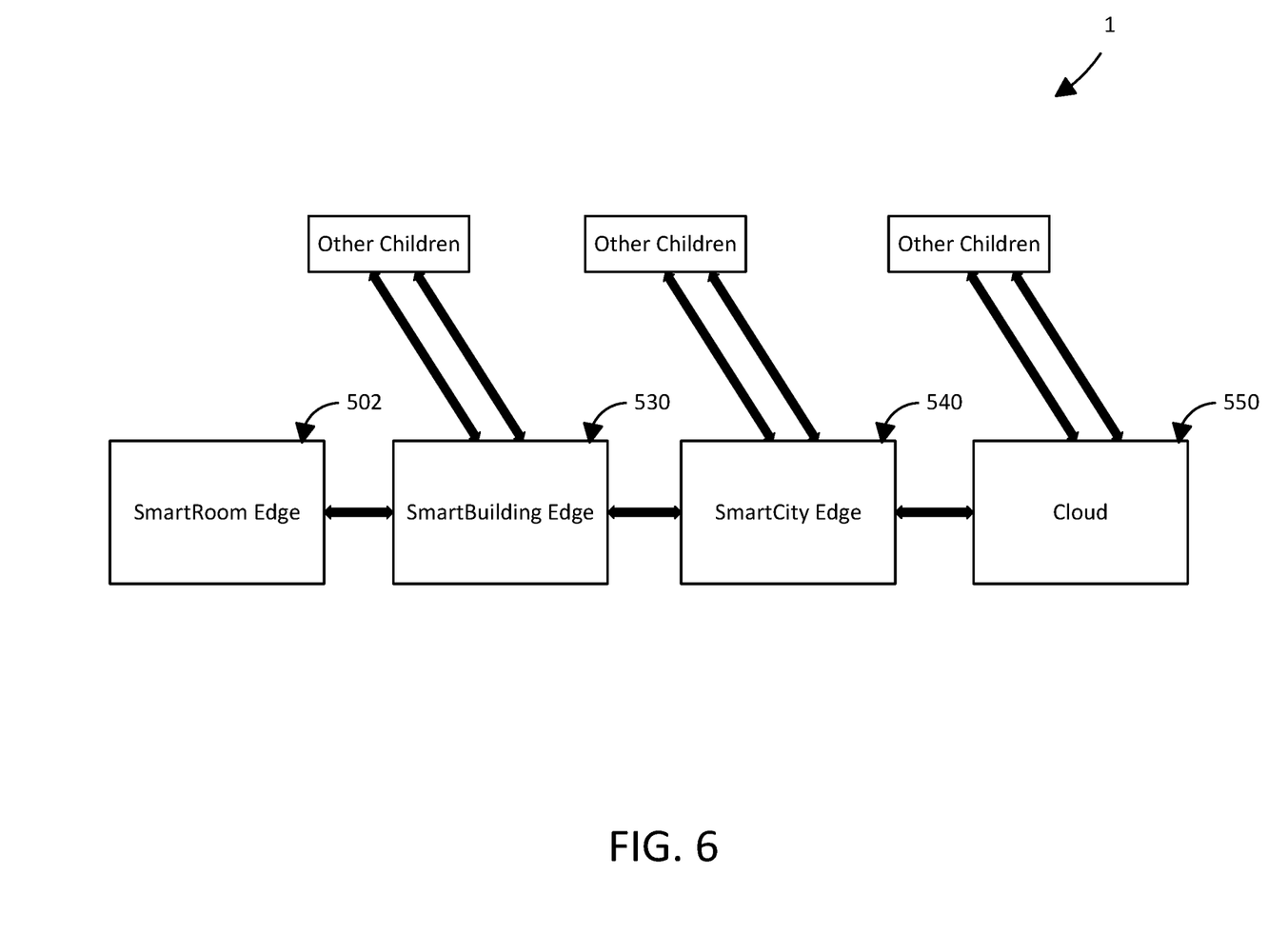
FIG. 6 is a flowchart depicting an exemplary method for a deployed ecosystem of IoT devices in accordance with some embodiments of the present disclosure.

As illustrated by FIG. 6, each edge may generally have a parent/child relationship, although in one embodiment, each edge may have exactly one edge and 0 to many child edges. In addition, a connection between edges may be configured to have a bi-directional information flow. An edge can ask its parent and any children for an API request to be fulfilled, and the networked edge will then either answer the request or pass it along to its connections for fulfillment.

In a first exemplary operation of the embodiment of system 1 depicted in FIGS. 5 and 6, an edge may ask its parent for information. As an example, child 502 may ask parent 530 whether a user (e.g., user 500 who goes by "Jim") can read the temperature. The SmartBuilding Edge has a sufficient dataset or integrations to implement the/getRoomUsers API and can let the SmartRoom Edge child 502 know that Jim is not allowed to read the temperature.

In a second exemplary operation of the embodiment of system 1 depicted in FIGS. 5 and 6, an edge may ask its children and parent for information but only get one answer. As an example, SmartBuilding Edge 530 (parent) may ask SmartRoom Edge 502 (child) and SmartCity Edge 540 (grandparent) what the temperature is. The SmartCity Edge 540 may not have a sufficient dataset or integrations to implement the /getRoomTemperature API and fulfill the request, may ask its children and parent, and may tell the SmartBuilding Edge 530 that it does not know what the temperature is. However, the SmartRoom Edge 502 has a sufficient dataset or integrations to implement the/get-RoomTemperature API and fulfill the request and can let the SmartBuilding Edge 530 know that the temperature is 78 degrees. The SmartBuilding Edge 530 only receives one answer (78 degrees).

In a third exemplary operation of the embodiment of system 1 depicted in FIGS. 5 and 6, an edge may ask its children and parent for information, and the edges must find the answer, but the edge only gets one answer. As an example, SmartBuilding Edge 530 (parent) may ask SmartRoom Edge 502 (child) and SmartCity Edge 540 (grandparent) what the temperature will be tomorrow. The SmartRoom Edge 502 may not have a sufficient dataset or integrations to implement the /predictTemperatureFromExternal API and fulfill the request, and may tell the SmartBuilding Edge 530 that it does not know what the temperature will be. The SmartCity Edge 540 also may not have a sufficient dataset or integrations to implement the /predictTemperatureFromExternal API and fulfill the request and determine what the temperature will be, and so may ask its children (other SmartBuilding Edges) and parent, the Cloud Edge 550 (great grandparent). The Cloud Edge 550 has a sufficient dataset or integrations to implement the /predictTemperatureFromExternal API and fulfill the request, and can let the SmartCity Edge 540 know that the temperature will be 44 degrees tomorrow. The SmartCity Edge 540 can then let SmartBuilding Edge 530 know that the temperature will be 44 degrees tomorrow. The SmartBuilding Edge 530 only receives one answer (44 degrees).

In a further example, an edge can be configured to filter messaging noise by examining messages that it receives and determining whether to forward them. If the edge determines that it has received essentially the same message previously, it can ignore the message and not forward it to its parent or children. However, when it receives a message updating a status of at least one previously received message (e.g., the message has not been received previously), the edge may forward the message to its parent or children. In this regard, the system 1 can preserve its ability to handle requests as close to the source of the request as possible without incurring delays from processing requests across multiple hops.

In some aspects, the domain model described in U.S. Pat. No. 9,038,015, can identify the different information providers, integration providers, and system behaviors of a particular application. This information can be used to define the API schema. As described in the appendix, while each computer in the hierarchy is aware of the API schema, each computer may not fully implement the API. In other words, a particular computer may not be able to answer any particular "question" (for example, who is allowed to set my temperature), but it knows whether that is a valid question that can be asked as configured by the domain model.

Figure 7:
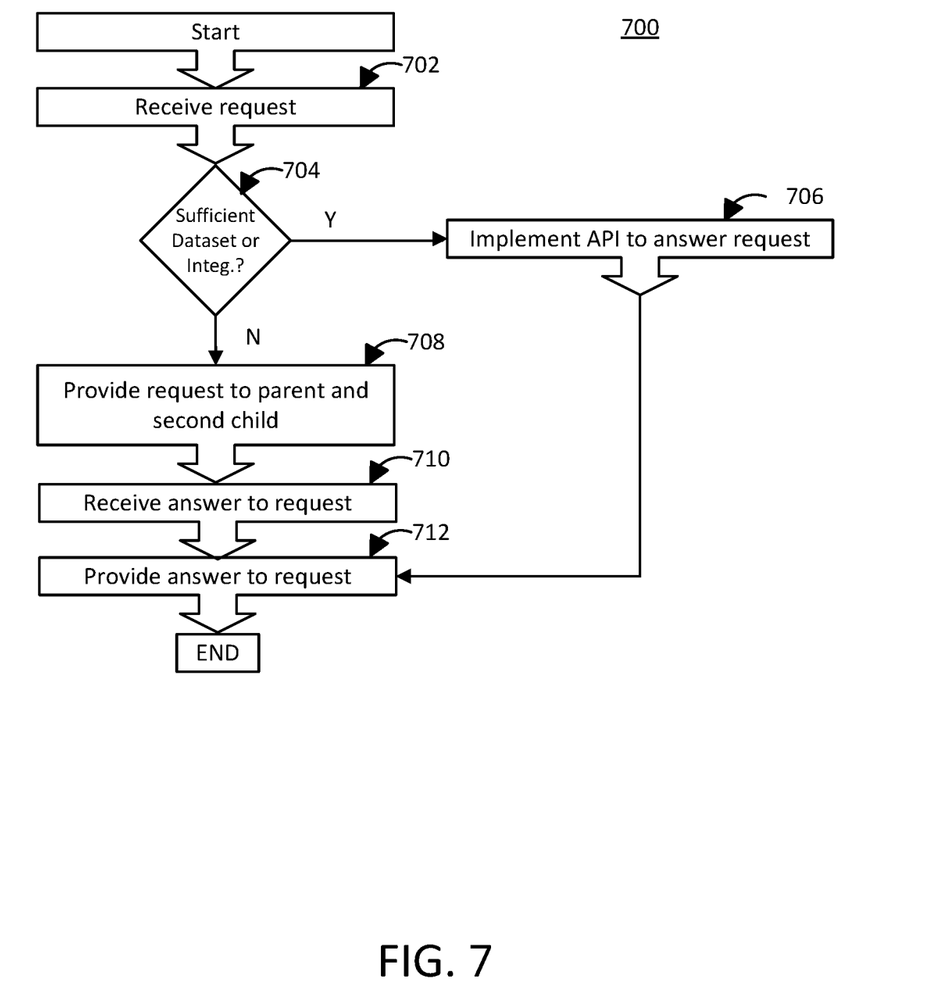
FIG. 7 depicts a data flow in accordance with some embodiments of the present disclosure.

FIG. 7 depicts a data flow 700 in accordance with some embodiments of the present disclosure. At step 702, at a node configured to communicate with other nodes in an Internet of Things (IoT) hierarchy (e.g., SmartBuilding Edge 530) may receive a request from a first child node (e.g., SmartRoom Edge 502). As noted above, answering the request may require implementation of an API based on either a dataset or an integration stored in memory at SmartBuilding Edge 530. At step 704, the node may determine whether the node has ether the dataset or integration that is required to implement the API and answer the request.

If the node determines that it has either the dataset or integration, at step 706, the node may implement the API to answer the request, and processing may proceed to step 712 where the node may provide the answer to the request to the first child node. Thereafter, processing may end.

If the node determines that it does not have either the dataset or integration, at step 708, the node may provide the request for information to a parent node of the node (e.g., a grandparent, such as SmartCity Edge 540) and at least a second child node (e.g., a peer of SmartRoom Edge 502). Thereafter processing may continue to step 710, where the node may receive answer to the request from either the parent node (e.g., a grandparent, such as SmartCity Edge 540) or the at least the second child node (e.g., a peer of SmartRoom Edge 502). Processing may then continue to step 712, where the node may provide the answer to the request to the first child node. Thereafter processing may end.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A method, comprising:

receiving, at a node configured to communicate with other nodes in an Internet of Things (IoT) hierarchy, a request from a first child node for information, wherein answering the request requires implementation of a first application programming interface ("API") based on either a first dataset or a first integration, wherein the request does not identify a location of the first dataset or the first integration that is required to implement the first API is located when received at the node;

determining, at the node, that the node does not have either the first dataset or the first integration that is required to implement the first API;

providing, from the node, the request to a parent node of the node and at least a second child node of the node, wherein the request is provided with regard to the position of the node within the hierarchy;

receiving, at the node, an answer to the request from either the parent node or the at least the second child node; and providing, from the node, the answer to the request to the first child node.

2. The method of claim 1, further comprising:
determining, at the node, that the request is for at least a portion of a data element that is not stored at the node, wherein the node has received a plurality of requests for the at least a portion of the data element from one or more child nodes of the node;
determining, at the node, a level of the plurality of requests; and
reallocating, to the node, the at least a portion of the data element, wherein the reallocating comprises storing the at least a portion of the data element at the node.

3. The method of claim 2, wherein the reallocating is based on the level of requests for the at least a portion of the data element, and wherein the level of requests is indicative of a number of requests over a period of time.

4. The method of claim 2, wherein the at least a portion of the data element is stored at the parent node or the at least the second child node of the node prior to the reallocating.

5. The method of claim 2, wherein the at least a portion of the data element comprises one or more of: (a) a temperature; (b) who has permission to read the temperature; (c) who has permission to set the temperature; (d) a likely temperature based on history; and (e) a likely temperature based on external factors.

6. The method of claim 1, wherein the providing the request for information to a parent node of the node and at least a second child node of the node is based on one or more of: (a) a cost efficient option; (b) a time performance optimization option; (c) priority; and (d) an order of communication between the parent node and the at least second child node.

7. The method of claim 1, wherein the first child node receives the answer only from the node.

8. The method of claim 1, further comprising:
determining, at the node, whether at least a portion of the request has previously been received at the node; and
ignoring at the node, the at least a portion of the request if it has previously been received at the node.

9. The method of claim 8, wherein the determining whether at least a portion of the request has previously been received at the node comprises determining whether the request includes a status update of at least one previously received message.

10. The method of claim 1, further comprising:
determining, at the parent node, that the parent node does not have either the first dataset or the first integration that is required to implement the first API;
providing, from the parent node, the request for information to a grandparent node of the node and at least one peer node of the node;
receiving, at the parent node, an answer to the request from either the grandparent node or the at least one peer node; and
providing, from the parent node, the answer to the request from either the grandparent node or the at least one peer node to the request to the node.

* * * * *